United States Patent [19]
Sorrentino

[11] Patent Number: 4,877,364
[45] Date of Patent: Oct. 31, 1989

[54] CAPTIVE SCREW AND ASSEMBLY

[75] Inventor: Gregory Sorrentino, Brewster, N.Y.

[73] Assignee: General DataComm, Inc., Middlebury, Conn.

[21] Appl. No.: 54,299

[22] Filed: May 26, 1987

Related U.S. Application Data

[63] Continuation of Ser. No. 758,194, Jul. 24, 1985, abandoned.

[51] Int. Cl.⁴ .................. F16B 21/00; F16B 35/04
[52] U.S. Cl. ............................. 411/337; 411/412; 411/424; 411/999; 403/408.1
[58] Field of Search ........... 411/337, 347, 352, 353, 411/360, 411, 412, 413, 424, 999, 333; 403/21, 408.1, 388

[56] References Cited

U.S. PATENT DOCUMENTS

| | | | |
|---|---|---|---|
| 1,927,780 | 9/1933 | Anderson | 411/337 |
| 2,123,764 | 7/1938 | Berry | 411/424 |
| 2,907,419 | 10/1959 | Klank, Jr. | 403/21 |
| 2,987,811 | 6/1961 | Acres | 411/337 |
| 3,295,874 | 1/1967 | Allen | 403/408.1 |
| 3,390,904 | 7/1968 | Jonelis | 411/999 |
| 3,426,321 | 2/1969 | Peterson, Jr. | 411/413 |
| 3,888,064 | 6/1975 | Basile | 403/408.1 |
| 3,986,318 | 10/1976 | McConnell | 403/408.1 |
| 4,032,806 | 6/1977 | Seely | 411/337 |
| 4,085,650 | 4/1978 | Flynn | 411/413 |
| 4,411,552 | 10/1983 | Lanham et al. | 403/408.1 |

FOREIGN PATENT DOCUMENTS

| | | | |
|---|---|---|---|
| 801031 | 12/1950 | Fed. Rep. of Germany | 403/408.1 |
| 1099620 | 3/1955 | France | 411/333 |
| 1388339 | 6/1965 | France | 411/337 |
| 2287613 | 5/1976 | France | 411/360 |

OTHER PUBLICATIONS

Schaer, J. A., *Western Electric Technical Digest*, No. 34, Apr. 1974, pp. 31–32.

Primary Examiner—Neill R. Wilson
Attorney, Agent, or Firm—David P. Gordon

[57] ABSTRACT

This invention relates to an improved captive screw and assembly, and particularly a screw which may be held loosely captive in the threaded hole of a support member. The invention comprises a machine screw or cold formed fastener with an unthreaded interrupted midsection that separates two spaced-apart threaded portions of the fastener, with both threaded portions of the fastener preferably of a similar thread size, and with the unthreaded mid-section of the screw of a diameter less than the root diameter of the threaded sections. The screw may be completely removed or readily installed into threaded engagement with a female threaded hole in the support member, when necessary, by first manually aligning the fastener axis with the axis of the threaded hole, then rotating the fastener to engage the starting threads of the fastener with those of the female threaded hole, and further continued rotating of the fastener in a conventional manner. The fastener may clamp a panel member to the support member. The panel member may be formed with a shaped hole to enable removal of the panel member from engagement with the fastener, when the fastener is held in the loosely captive mode to the support member.

13 Claims, 2 Drawing Sheets

CAPTIVE SCREW AND ASSEMBLY

This patent application is a continuation of U.S. patent application No. 758,194 filed July 24, 1985, Art Unit 358, now abandoned.

FIELD OF THE INVENTION

This invention relates generally to an improved captive screw and assembly, and particularly a screw which may be held captive to a panel member against inadvertent separation from the panel member when the panel member is not otherwise fastened by the screw to any other support member; but with provision for ready detachment of the screw from the panel, as desired.

STATEMENT OF THE PRIOR PATENTS

The art is exemplified by the disclosures of the following U.S. Pat. Nos. 4,085,650, 4,258,607, 1,440,613, 4,179,976, 3,256,661, 4,018,132, 1,166,673, 3,426,321, 4,460,005, and 363,450.

These patents disclose articles generally illustrative of various devices of this type. While such devices are usually acceptable for their intended purposes, they have not proven to be entirely satisfactory in that they are either complex and or require unusual skill and or dexterity to operate. As a result of the shortcomings of the prior art, typified by the above, there has developed and continues to exist a substantial need for devices of the character described. Despite this need, and the efforts of many individuals and companies to develop such devices, a satisfactory device meeting this need has been heretofore been unavailable.

The principal object of this invention is to provide an article of this character which combines simplicity, strength and durability in a high degree, together with inexpensiveness of construction.

Other objects of this invention will in part be obvious and in part hereinafter pointed out.

While prior patents describe various forms of screws, none suggest the combination of elements which provide the effectiveness, economy of production and of use and simplicity of this invention.

SUMMARY OF THE INVENTION

This invention relates generally to an improved captive screw and assembly, and particularly a screw which may be held loosely captive in the threaded hole of a support member. A panel member may be fastened by this screw against the support member when so desired. Inadvertent separation of the screw from the support member is prevented after loosening of the screw from threaded engagement with the female threaded hole of the support member; and one or more panel members fastened by the screw to the support member may be readily removed from and or re-engaged to the screw. The panel members may be installed between the support member and the head of the screws while the screw is loosely retained in the captive mode to the support member, and then fastened in place by engaging the threads of the screw with the female threads of the tapped hole of the support member. If desired, the screw may be readily completely detached from or re-installed to the support member, from or to the captive position in which it is loosely engaged by the support member.

The invention comprises a machine screw or cold formed fastener with an unthreaded interrupted mid-section that separates two spaced-apart threaded portions at the head end and the tail end of the fastener. Both threaded portions of the fastener are preferably of a similar thread size, and the unthreaded mid-section of the screw is of a diameter less than the root diameter of the threaded sections. The unthreaded mid-section of the fastener is of a greater axial length than the thickness of the support member to which it is to be mounted so that the under-size unthreaded mid-section of the screw loosely fits into the threaded hole of the support member and the fastener is loosely held captive to support member in this position. In this captive position, the interrupted unthreaded screw section extends completely through the female threaded hole of the support member and the screw may be loosely angled with relation to the axis of the threaded hole of the fixed support member as desired. The screw may be completely removed or readily installed into threaded engagement with the fixed support member, when necessary, by first manually aligning the fastener axis with the axis of the threaded hole, then rotating the fastener to engage the starting threads of the fastener with those of the female threaded hole, and further continued rotating of the fastener in a conventional manner.

Removal of the screw fastener, from loose captive engagement of the unthreaded mid-section of the fastener to the support member female thread, requires a specific manual effort for alignment of the fastener about the axis of the female thread and for engaging of the starting mating threads, when first rotating the fastener. Such movement of the fastener relative to the support member cannot readily occur inadvertently, regardless of vibration, and the fastener can be reliably anticipated to remain in the loose captive state until it is desired to either fasten a panel member to the support member, or to remove the screw completely from engagement with the support member, by conventional threaded engagement of the head or tail threaded portion of the fastener to the female thread of the support member.

The invention may also include a panel member to be bolted by the fastener against the support member. This panel member may be formed with a through hole larger than the major diameter of the thread of the screw. Preferably, the hole in the panel member is in the shape of a keyhole, having a shaped slot which extends to an external edge of the panel so that the panel member may be readily detached or attached to the unthreaded or threaded section of the fastener while the fastener is loosely held captive in the support member. This shaped slot in the panel is of a width greater than the major diameter of the threaded section of the screw and less than the shoulder diameter of the screw so that the panel can only be removed from the threaded or unthreaded mid-section of the fastener in the loosened captive mode, but the keyhole slot of the panel can not be passed freely over the shoulder or head of the fastener.

The axial length of the interrupted section of the screw is preferably of a length one to two times greater than the threaded section of the support member, for maximum offset between the screw and support member threaded sections. The panel thickness "T1" should be no wider than shoulder thickness "T3", to provide a positive fit between screw head and support member.

The support member may be alternatively formed with an unthreaded through hole of a larger size than the major diameter of the fastener thread, with a sheet metal nut such as a "Tinnerman" brand sheet nut mounted to the support member hole.

The principal object of this invention is to provide an article of this character which combines simplicity, strength and durability to a high degree together with ease of use and inexpensiveness of construction.

Other objects of this invention will in part be obvious and in part hereinafter pointed out.

DESCRIPTION OF THE BEST MODE OF THE INVENTION

Figure 8:
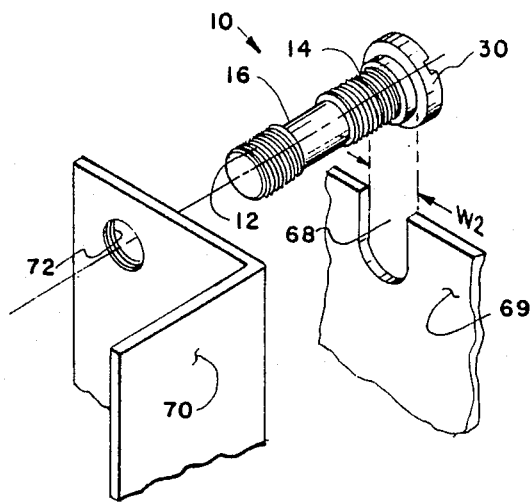
FIG. 8 is a an exploded detail perspective view of a second alternative embodiment of the invention.
Figure 5:
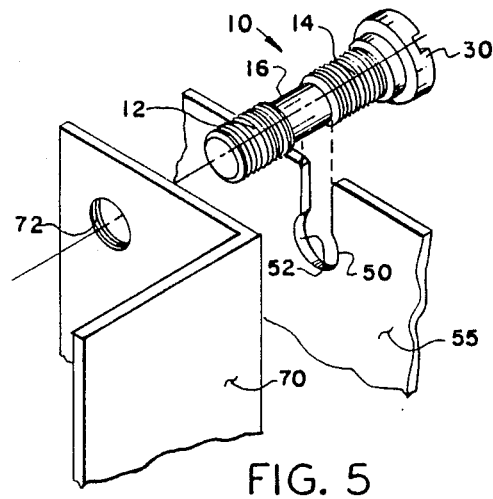
FIG. 5 is an exploded detail perspective view of of the invention.

Turning now descriptively to the drawing, in which similar reference characters denote similar elements throughout the view, FIGS. 1-9 illustrate the fastener screw 10 of the invention. Screw 10 is formed of a shank section 40 and a head section 30.

Shank section 40 is formed of two similar male threaded sections 12 and 14 interrupted by an unthreaded section 16, the diameter "D1" of which is less than the minor diameter of the threaded sections 12 and 14 and less than the minor diameter of the corresponding female thread 72. A shoulder section 38 joins the head thread section 14 to the cap section 36, with the diameter "D3" of shoulder section 38 being greater than the major diameter of the threaded sections and less than the diameter of the cap section 36. Cap section 36 may be formed with a conventional external slot 34 and may be of a circular shape, with a knurl 32 formed about the cap edge, or alternatively cap section 36 may be of a polygonal shape, or fitted with thumbscrew ears or the like.

A beveled section 39 may be formed on the leading edge of shoulder section 38 to assist in aligning the shoulder section 38 to the walls 62 of a closed hole 60 or the walls 52 of the circular section 54 of a keyhole-shaped hole 50 of a panel member 65 or 55 respectively.

The panel member 55 or 65 is fastened by the screw 10 to abut against the support member 70 in the fastened mode of the invention. This panel member may be formed with a through hole with a circular section 57 larger than the major diameter of the thread of the screw and of a size to fit about fastener shoulder section 38, if the fastener is formed with a shoulder section 38. Preferably, the hole in the panel member is in the shape of a keyhole, with a circular section 57 communicating with a shaped slot section which extends to an external edge 62 of the panel 55 so that the panel member may be readily detached or attached to the screw while it is held captive in the support member.

Figure 3:
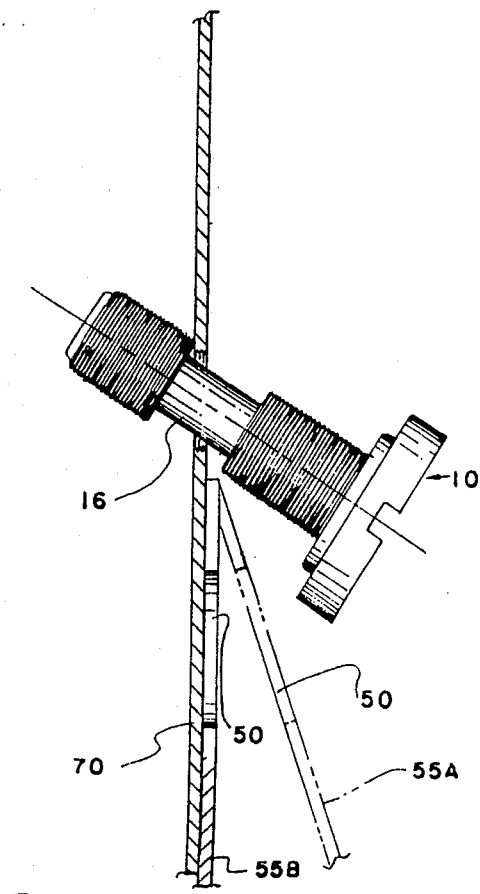
FIG. 3 is a detail sectional side view of the invention in use, in the captive unfastened mode of the screw.
Figure 2:
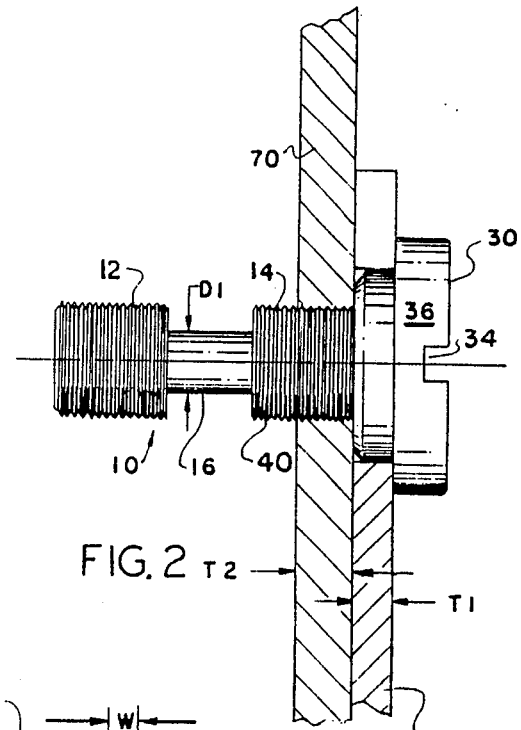
FIG. 2 is a detail sectional side view of the invention in use, in the fastened mode of the screw.

This shaped slot in the panel 55 is of a width "W" that is greater than the major diameter of the threaded section 14 of the fastener 10, and less than the shoulder diameter "W2" so that the panel can only be removed from the screw when the screw is in the loosened captive mode shown in FIG. 3. The axial length "L1" of the interrupted section of the screw is preferably of a length one to two times greater than the thickness of "T2" of the threaded section of the support member 70, as shown in FIG. 2. Slot 59 of open keyhole 50 may be formed with an entering bevel 53 section on each wall of the slot to assist in installing a panel 55 onto the screw 10, when it is held in the loose captive mode as shown in FIG. 3.

As shown in FIG. 3, a panel 55a may be oriented along a diagonal plane to the plane of the support member 70, or a panel 55b may be oriented along a parallel plane to support member 70 during this installation process, since fastener 10 is free to wobble at any desired angle to the support member despite the captive relation, by virtue of the fact that the unthreaded mid-section 16 of the fastener is of a lesser diameter than the minimum diameter (female minor diameter) of the threaded hole 72 and this mid-section 16 is of greater length than the thickness of support member 70 adjacent to hole 72. As shown in FIG. 3, the screw 10 normally extends, in the captive mode, along a diagonal axis due to the greater weight of the head end of the screw, and particularly so when the axis of the hole in which it is held captive lies along a horizontal axis, as shown in FIG. 3. This diagonal axis of the rest position of captive screw 10 further precludes inadvertent loosening of a fastener from engagement in the captive mode.

Figure 9:
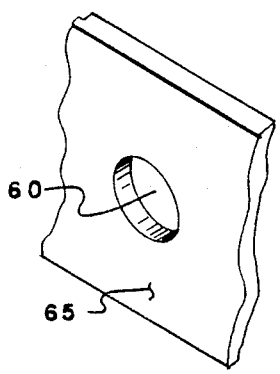
FIG. 9 is a detail elevation view of an alternative embodiment of a panel member of the invention.
Figure 10:
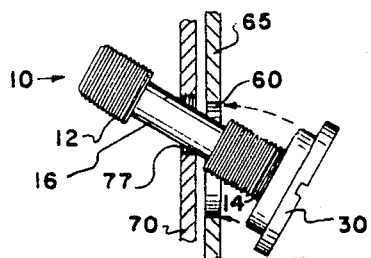
FIG. 10 is a detail sectional view of the alternative embodiment in use.
Figure 4:
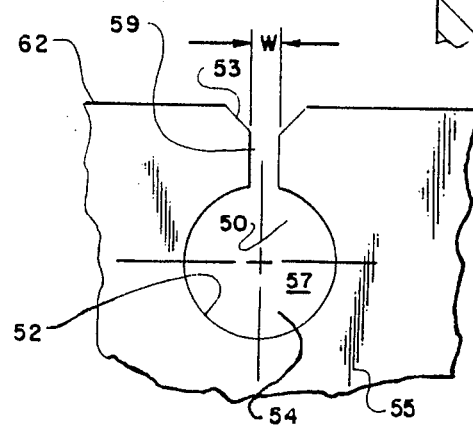
FIG. 4 is a detail front view of a panel employed with the invention.

The fastener 10 may be employed with a panel member 65, shown in FIG. 9, in which the panel member is formed with a through circular hole 60 of smaller cross-section than that of the head 30 of the fastener 10. In this case, the threaded sections of fastener 10 must be inserted through panel hole 60 prior to being initially threaded into a female threaded hole 72 of a support member 70. As shown in FIG. 10, this embodiment of the invention provides for loosening of both screw fastener 10 and panel member 65 from the fastened position, while maintaining both panel member 65 and fastener 10 in loose captive relation to support 70. This enables the user to rotate or pivot panel member 65 with relation to structural support member 70 so as to provide access to a chamber (not shown) that is blocked by the panel member in the fastened mode, while preventing inadvertent loss of either fastener 10 and panel member 65. Where a panel member 65 is mounted by a plurality of fasteners 10 to one or more support members 70, only one fully closed hole 60 need be provided in the panel member for providing this captive feature. The other mounting holes in the panel may be open keyhole-shaped holes 50 as shown in FIG. 4, or the open slots 68 shown in FIG. 8.

FIG. 8 illustrates a panel member 69 formed with an open slot 68 of at least the width "W2" of the shoulder diameter of the screw. Such open slots may be employed for locations where it is desired to remove the panel member 69 from engagement with the fastener, while the fastener threads are engaged with the female threads of the support member.

Figure 7:
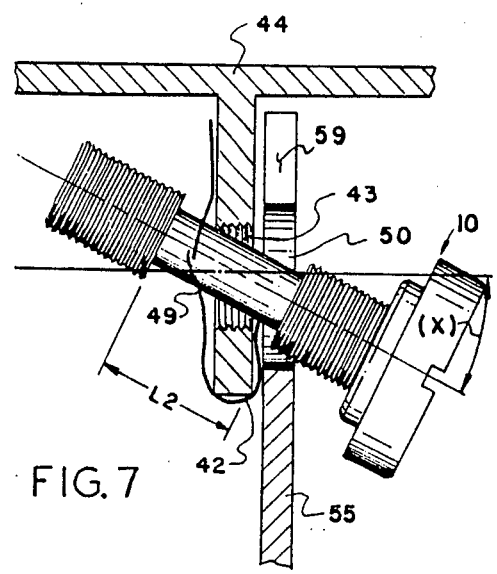
FIG. 7 is a detail sectional view of the invention employed with a sheet metal nut member.

Sheet metal nuts or threaded sheet metal clips 42 such as those known as "Tinnerman" brand may be employed for the female threaded member of a support member 44, which is formed with a through hole 43 of larger diameter than the major diameter of the threads of fastener 10, and with a threaded clip fastener 42 mounted adjacent to support member hole 43. The axial length "L2" of the unthreaded mid-section of fastener 10 would be selected to provide the necessary clearance for free motion of the fastener in the loose captive mode as shown in FIG. 7 and this length would be larger than both the thickness of the panel member 55 and that of the support member 44 to include clearance for the bent segments 49 of the clip nut 42 that serve as the thread engaging means.

Figure 1:
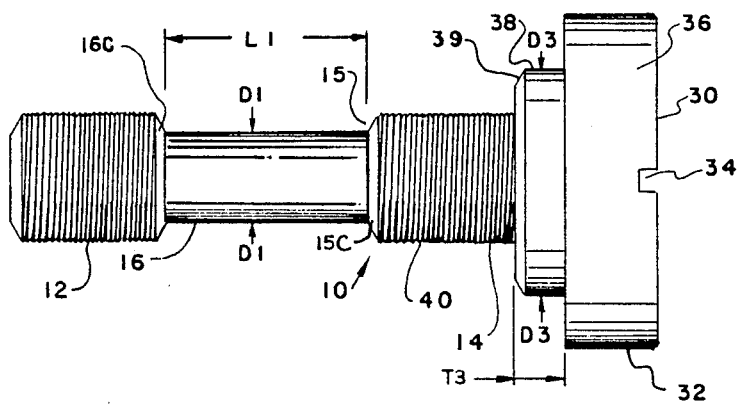
FIG. 1 is a side view of the screw of the invention.
Figure 6:
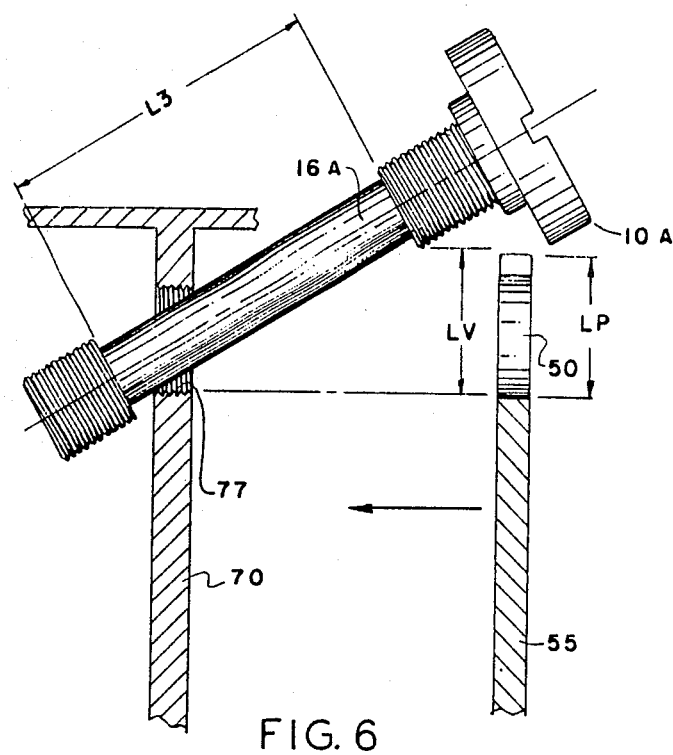
FIG. 6 is a detail sectional side view of an alternative embodiment of the screw member of the invention.

As shown in FIG. 6, fastener 10A is an alternative embodiment of the invention in which the axial length L3 of the unthreaded mid-section 16A of the fastener is increased from that shown in FIG. 1 so that the panel member 55 may be installed while held in parallel array to the plane of the support member 70 to which screw 10A is held captive. L3 is of a length to permit fastener 10A to be held in hole 77 at a diagonal angle to the plane of a panel member 55 such that the vector "LV" of length "L3" which is parallel to panel member 55 and which projects on the panel side of the support member from hole 77 is no less than the distance "LP" from the open edge of the keyhole 50 of panel member 55 to the opposed wall of the hole to enable panel 55 to slip on or off of the unthreaded mid-section 16 when the panel is moved towards or from the support member and held in parallel array with the support member.

The screw can be manufactured on an automatic screw machine or cold formed and care is exercised in manufacture to avoid burrs on the starting sections of the screw threads adjacent the unthreaded section of the finished screw fastener so that either threaded portion of the screw can become engaged to the threads of a mating female threaded hole. Chamfer sections 15C and 16C, each of a forty five degree chamfer will provide for ready starting engagement.

The device of the invention has been thoroughly tested under actual use conditions and has been found to be completely successful for the accomplishment of the above stated objects of the present invention.

It will thus be seen that there is provided a device in which the several objects of the invention are achieved, and which is well adapted to meet the conditions of practical use.

It is thought that persons skilled in the art to which this invention relates will be able to obtain a clear understanding of the invention after considering the foregoing description in connection with the accompanying drawing. Therefore, a more lengthy description is deemed unnecessary. It is understood that various changes in shape, size, and arrangement of the elements of this invention as claimed may be resorted to in actual practice, if desired.

Having thus described the invention, what I claim as new and desire to secure by Letters Patent of the United States is:

1. A threaded fastener assembly, adaptable to detachably fasten a panel member to a support member of the assembly in a first mode of operation, which assembly includes a male threaded fastener screw member that may be loosely held in captive relation to said support member in a second mode of operation, which screw member is adaptable to be readily detached by manual effort from said support member and which screw member is adaptable to be readily subsequently reengaged by manual effort to said support member, comprising:

a support member having a female threaded hole; and
a male threaded screw member having a head and a shank, said shank shaped with an unthreaded midsection of the shank that separates to spaced-apart male threaded portions of the same pitch and thread size, said unthreaded mid-section of said screw member shank having a diameter smaller than the root diameter of the said threaded sections, said head and the threaded head-end portion of the shank adjacent said head being heavier than the other tail-end threaded portion of said shank so that when said unthreaded mid-section of said screw fastener is loosely held in unthreaded engagement in the female threaded hole of said support member, said male threaded screw member tilts relative to the axis said male threaded screw member assumes when it is in threaded engagement with said female threaded hole such that said male threaded screw member is captive to said support member and such that accidental threaded engagement of either said tail-end or said head-end threaded portion with said female threaded hole is eliminated, wherein, said female threaded hole is of a thread size to readily mate in threaded engagement with either of the threaded portions of said screw member so that the screw member may be readily engaged into or removed from engagement with said female threaded hole, with said screw member adaptable to be retained in a captive mode to said support member, with its unthreaded midsection held loosely in said female threaded hole of said support member without stressing the threaded portions of said threaded fastener assembly during said captive mode and during positioning of said screw member into or out of said captive mode, and with said screw member adaptable to detachably bolt a panel member to said support member in threaded engagement of the head-end threaded portion of the screw member to the said female threaded hole, and in which said screw member is readily manually detachable from captive engagement to said female threaded support member.

2. The fastener of claim 1 wherein said male fastener is of a size and shape such that each of the threaded portions can matingly engage with the female thread of a threaded hole in said female threaded member and wherein the axial length of the unthreaded midsection of the male fastener exceeds the thickness of the threaded section of said female member bounding said thread hole.

3. The fastener of claim 1 in which at least one of said threaded portions of said fastener is formed with a chamfer adjacent the unthreaded mid-section of the fastener.

4. The fastener of claim 3 in which both of said threaded portions of said fastener are each formed with a chamfer section adjacent the unthreaded mid-section of the fastener.

5. The fastener and female threaded member of claim 2, in which the axial length of the unthreaded mid-section of the fastener is of a substantial greater length than the thickness of the female threaded member adjacent the threaded hole of said female threaded member, so as to permit the fastener, in the captive mode, to be loosely oriented at a substantial diagonal angle to the axis of said thread hole, when the unthreaded mid-section of the fastener is positioned within the confines of the threaded hole of the female member.

6. The fastener of claim 1 together with a panel member which is to be bolted by said fastener in abutting relationship to said female threaded member, in which
   said fastener is formed with a head section that is of greater diameter than the major diameter of either threaded portion of said fastener, with
   said panel formed with a hole, the cross-section of which hole is of a greater size and shape than the major diameter cross-section of each of the threaded sections of the fastener, and of a lesser size and shape than that of the head section of the fastener so that
   the said fastener may bolt the said panel member to the said female threaded member by the fastener fitting through the said panel hole, with the panel member held against said threaded member by the head section of the fastener, when the threaded portion of the fastener that is adjacent to the head section is engaged to the female thread to the said female threaded member, and such that
   in the loosened position of the fastener, said panel member may not become inadvertently separated from the fastener or the said female threaded member because of the captive engagement of the fastener to the female threaded member, by retardation of the unthreaded mid-section of said fastener in the confines of the threaded section of the female thread of the female threaded member.

7. The fastener of claim 6, in which said fastener is formed with a head section and a shoulder section adjacent said head section, with said shoulder section of lesser cross-sectional size than that of the head section, and of greater cross-sectional size than that of the major diameter cross-section of either threaded portion of said fastener, with the said hole of said panel of a greater cross-sectional size and shape than that of said shoulder section of the fastener.

8. The fastener of claim 1 together with a panel member which is to be bolted by said fastener in abutting relationship to said female threaded member, in which
   said fastener is formed with a head section that is of greater size in cross-section than that of the major diameter cross-section of either threaded portion of said fastener, and
   said panel is formed with a panel hole of a size and shape to fit about the threaded portions of said fastener, which panel hole is of a lesser cross-section than that of the head section of the fastener for a first section of said hole so that the panel member may be bolted to the female threaded member by the fastener fitting through the said first section of said panel hole, with the panel member held against said threaded member by the head section of the fastener, when the threaded portion of the fastener that is adjacent to the head section is engaged to the female thread of the said female threaded member, and in which
   a second section of said hole of said panel member is of a size and shape to enable the panel member to be engaged to or completely released from the fastener member, when the fastener member is loosely held captive to a female threaded member with the unthreaded portion of the fastener positioned within the confines of a female threaded hole of the female threaded member.

9. The fastener and panel member of claim 8 in which the said hole of said panel member is of a keyhole-shape.

10. The fastener and panel member of claim 9 in which the second section of said hole of said panel member is formed with a slot section that extends to an edge of the panel member.

11. The fastener and panel member of claim 10 which the width of said slot section is less than the diameter of the head section of the fastener.

12. The fastener and panel member of claim 10 in which the width of said slot section is less than the major diameter of the threaded portions of the fastener so that the panel member may not be removed from engagement about the fastener between the female threaded section and the head section of the fastener when the threaded portion of the fastener that is adjacent to the head section of the fastener is engaged in threaded engagement to the female thread of the female threaded member.

13. The fastener and panel member of claim 11 in which said fastener is formed with a head section and a shoulder section adjacent said head section, with said shoulder section of lesser cross-sectional size than that of the head section and of greater cross-sectional size than that of the major diameter of either threaded portion of said fastener, with the said hole of said panel of a greater cross-sectional size and shape than that of said shoulder section of the fastener, and in which
   the width of said slot section of said panel member is less than the minimum shoulder diameter of the fastener so that
   the panel member may not be removed from engagement about the shoulder section of the fastener member, after having been so engaged with the shoulder section of the fastener when the threaded portion of the fastener member that is adjacent to the shoulder of the fastener is engaged in threaded engagement to the female thread of the female threaded member.

* * * * *